March 6, 1928.    J. KRČ    1,661,950

ANIMAL TRAP

Filed May 26, 1927    2 Sheets-Sheet 1

INVENTOR.
John Krč.
BY Bryant & Lowry
ATTORNEYS

March 6, 1928.

J. KRČ

ANIMAL TRAP

Filed May 26, 1927

INVENTOR.
John Krč.
by
Bryant & Lowry
ATTORNEYS

Patented Mar. 6, 1928.

1,661,950

UNITED STATES PATENT OFFICE.

JOHN KRČ, OF WALLIS, TEXAS.

ANIMAL TRAP.

Application filed May 26, 1927. Serial No. 194,396.

This invention relates to animal traps, and has more particular reference to that type of animal trap particularly adapted for use in trapping small animals, such as rats, and embodying spring actuated choker-loop carrying frames.

The primary object of the present invention is to provide an improved form and arrangement of trip catches, in a trap of the above kind, by means of which locking bars are held in downwardly swung positions to retain the spring actuated frames in set position.

Still another object is to provide, in a trap of the above kind, a novel arrangement of the bait holder and trip catches, whereby most effective and positive release of the frames is insured upon the attempt of the animal to gain access to the bait.

A further object is to provide an improved construction whereby access to the bait holder may be readily and conveniently had for renewal of the bait from time to time, and whereby unobstructed access to the interior of the trap can also be had for the convenient removal of the trapped animals.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a top plan view of an animal trap constructed in accordance with the present invention and with the spring actuated frames in set positions;

In the construction of traps of the present character, it has heretofore been proposed to mount the trip catches upon transverse axes for swinging movement longitudinally of the trap body, the lower portion of the trip catch being adapted to obstruct the passage through the trip body. This arrangement has not been entirely satisfactory due to the fact that the obstruction part of the trip catch entirely prevented access to the bait so that the animal was not sufficiently encouraged to gain access to the latter. In other cases the obstruction portion of the trip catch left sufficient clearance to not ensure actuation of the trip catch by animals of unusually small size. Moreover, in either instance, the arrangement of the prior trip catches was such as to make the setting of the trap a tedious and somewhat dangerous operation.

I have found that a considerably more reliable trap construction is had by mounting the trip catches to swing laterally of the trap upon longitudinal axes, at the same time so restricting the passage through the trap body as to insure that the animal will brush against the trip catches in attempting to gain access to the bait, so that effective release of the trap is insured. With this arrangement the bait holder can be mounted upon the side of the trap in a position to encourage the animal to attempt to gain access thereto, and the setting of the trap is made possible with the liability of accidental springing of the trap reduced to a minimum.

Figure 1:
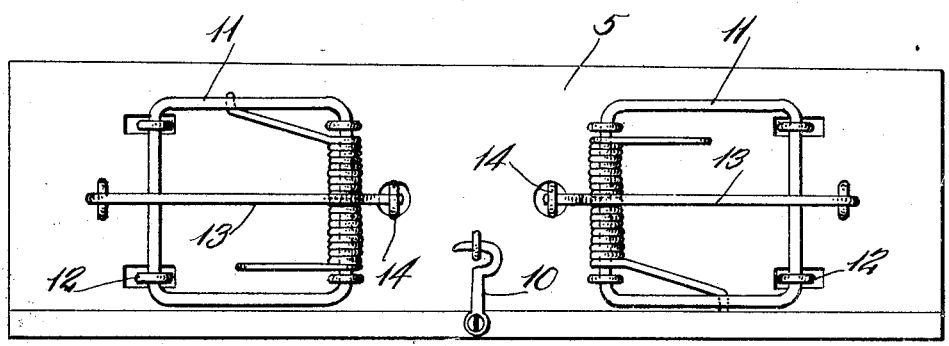
Figure 2:
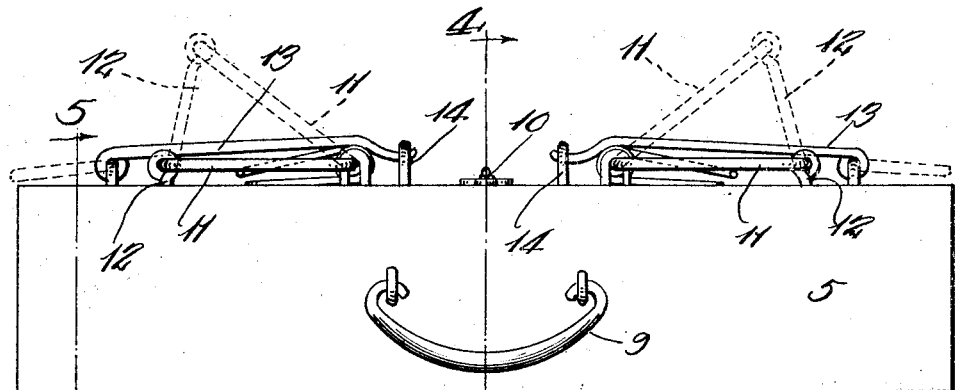
Figure 2 is a side elevational view thereof with the parts indicated in sprung positions by dotted lines.
Figure 3:
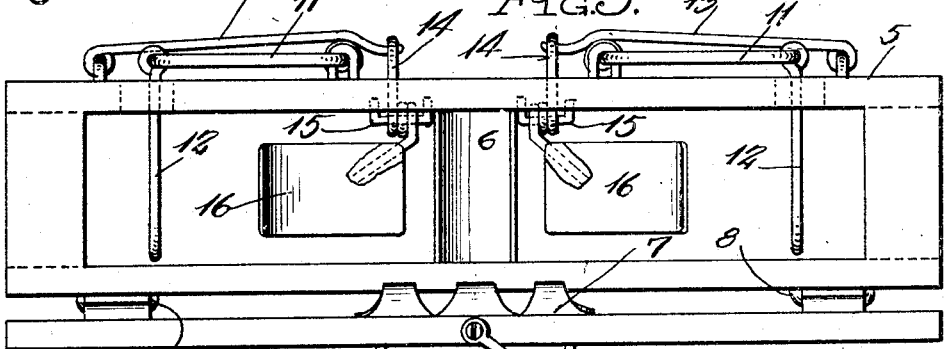
Figure 3 is a view similar to Figure 2 with the hinged bait holder carrying side wall of the trap body in open position.
Figure 4:
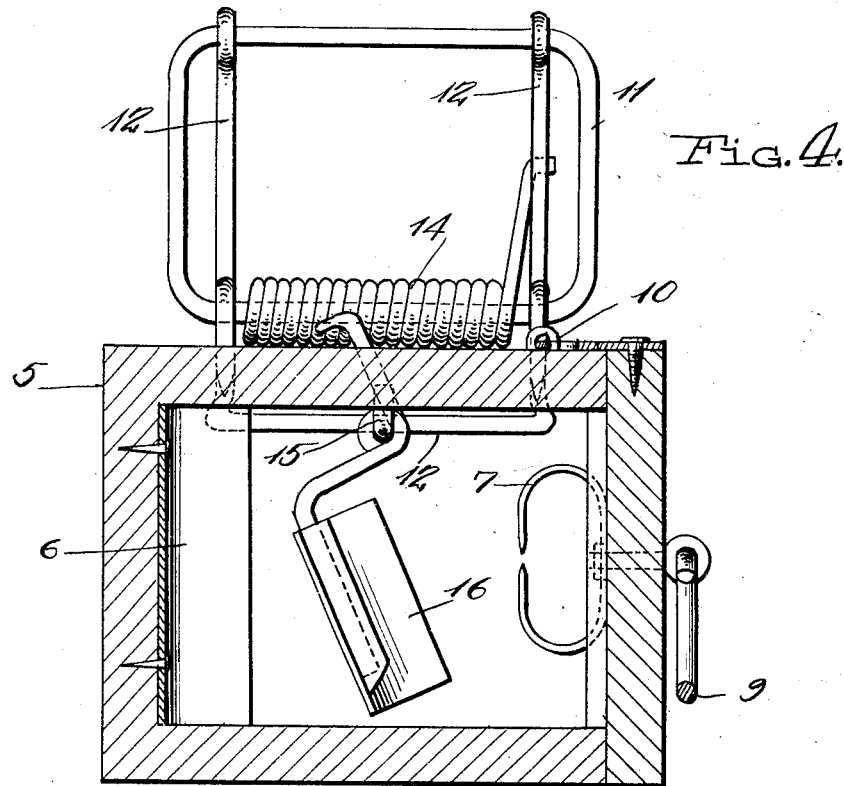
Figure 4 is a central transverse section taken substantially upon line 4—4 of Figure 2 with the spring actuated frame in released position.

In carrying out the above objects of the invention a tubular trap body 5 is provided, preferably of rectangular cross section as shown and open at the ends. Rigidly attached to one side wall of the trap body 5 interiorly of the latter and midway between its ends is an upright channel-shaped member 6 which forms an obstruction to partially restrict the size of the passage through the body. Rigidly secured upon the inner face of the other side wall of the trap body directly opposite the obstruction 6 is a suitable bait holder 7 preferably consisting of a longitudinally split sheet metal tube of flat form cut away at a plurality of points to expose the bait placed endwise therein. The latter side wall of the trap body is hinged to the bottom wall of the trap body as at 8 so that said side wall may be swung outwardly and downwardly to a substantially horizontal position as shown in Figure 3 for substantially entirely exposing the interior of the trap body and at the same time permitting convenient access to the bait holder 7 for renewal of the bait when found necessary. A suitable handle 9 may be carried by the hinged side wall and the latter is suitably held in closed position by means of a catch 10.

A trapping mechanism is located at each of the opposite ends of the body, and each trapping mechanism consists of a spring actuated frame 11 of well known form mounted upon the top of the trap body 5, a choker loop 12 attached to the outer end of the frame and passing through the top of the trap body, a pivoted locking bar 13 adapted to be swung inwardly and downwardly to overlie the outer end of the frame 11, and a trip catch 14 to engage the free rear end of the locking bar 13 for retaining the spring actuated frame 11 in lowered set position.

Figure 5:
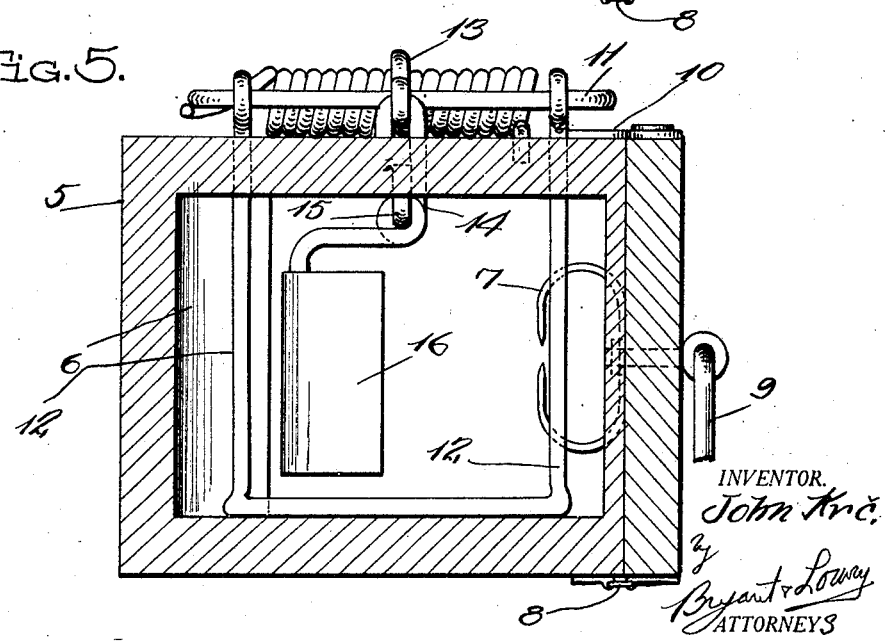
Figure 5 is a transverse section taken substantially upon line 5—5 of Figure 2 with the spring actuated frame in set position.

In accordance with the present invention each trip catch 14 is pivotally mounted for lateral swinging movement upon an axis as at 15 carried at the underside of the top wall of the trap body. The trip catches 14 are thus mounted upon longitudinal axes at opposite sides of the obstruction 6, and the hooked upper ends of the trip catches are directed laterally in a direction toward the side at which the obstruction 6 is located so as to extend across the free ends of the locking bars when the trap is set. This arrangement insures that the lower ends of the trip catches must be pressed toward the side of the trap at which the obstrucion 6 is located in order to effect release of the spring actuated frames, an operation naturally resulting when the animal attempts to wedge between a trip catch and the adjacent side wall of the trap body carrying the bait holder 7. In order to further restrict the passage through the trap to more positively insure this operation, the trip catches have their lower ends in the form of horizontally curved obstruction forming plates 16 which lie in close proximity to the inwardly projecting flanges of the obstruction 6 when the trap is set as shown more clearly in Figure 5.

The trap is set by depressing the free ends of the frames 11 and swinging the locking bars 13 over said free ends with the hooked upper ends of the trip catches 14 engaged over the free inner ends of the locking bars 13 as shown in the several views. Before setting the trap in this manner, the hinged side wall of the trap body is preferably swung open and the bait placed in the bait holder 7, after which said hinged side of the trap body is closed and latched. With the trap baited and set, an animal entering either end of the trap body will scent the bait, and in the endeavor to reach the latter will come in contact wth a plate portion 16 of one of the trip catches 14 thereby swinging the latter laterally to disengage its hooked end from the associated locking bar 13 and liberating the proper spring actuated frame 11 so that the choker loop 12 of said frame will be forcibly elevated for impinging the animal between the loop and the top of the trap body. By opening the hinged wall of the trap body and depressing the spring actuated frame which has been tripped, the animal may be readily released and removed.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. An animal trap comprising a tubular body, an obstruction attached to one side of the body and extending partly across the passage of the body intermediate the ends of the latter, a bait holder within the body and attached to the other side of the latter opposite said obstruction, choker-loop trapping mechanisms located at the opposite ends of the body, and laterally swinging trip catches for the respective trapping mechanisms pivoted to and extending through the top of the body at opposite sides of the obstruction.

2. An animal trap comprising a tubular body, an obstruction attached to one side of the body and extending partly across the passage of the body intermediate the ends of the latter, a bait holder within the body and attached to the other side of the latter opposite said obstruction, choker-loop trapping mechanisms located at the opposite ends of the body, and laterally swinging trip catches for the respective trapping mechanisms pivoted to and extending through the top of the body at opposite sides of the obstruction, said other side of the body being hinged to the bottom of the latter and having means to latch the same in closed position.

3. An animal trap comprising a tubular body, an obstruction attached to one side of the body and extending partly across the passage of the body intermediate the ends of the latter, a bait holder within the body and attached to the other side of the latter opposite said obstruction, choker-loop trapping mechanisms located at the opposite ends of the body, and laterally swinging trip catches for the respective trapping mechanisms pivoted to and extending through the top of the body at opposite sides of the obstruction, and longitudinally curved passage obstructing plates on the lower ends of the trip catches within the body.

4. An animal trap comprising a tubular body, an obstruction attached to one side of the body and extending partly across the passage of the body intermediate the ends of the latter, a bait holder within the body and attached to the other side of the latter opposite said obstruction, choker-loop trapping mechanisms located at the opposite ends of the body, and laterally swinging trip catches for the respective trapping mechanisms pivoted to and extending through the top of the body at opposite sides of the obstruction, said trapping mechanisms further embodying spring actuated frames having longitudinally arranged locking bars, and said trip catches having laterally directed hooks on their upper ends adapted to extend across the locking bars to retain the frames set.

5. An animal trap comprising a tubular body, an obstruction attached to one side of the body and extending partly across the passage of the body intermediate the ends of the latter, a bait holder within the body and attached to the other side of the latter opposite said obstruction, choker-loop trapping mechanisms located at the opposite ends of the body, and laterally swinging trip catches for the respective trapping mechanisms pivoted to and extending through the top of the body at opposite sides of the obstruction, said trapping mechanisms further embodying spring actuated frames having longitudinally arranged locking bars, and said trip catches having laterally directed hooks on their upper ends adapted to extend across the locking bars to retain the frames set, said hooks projecting in a direction toward the side of the body at which said obstruction is arranged.

6. An animal trap comprising a tubular body, an obstruction attached to one side of the body and extending partly across the passage of the body intermediate the ends of the latter, a bait holder within the body and attached to the other side of the latter opposite said obstruction, choker-loop trapping mechanisms located at the opposite ends of the body, and laterally swinging trip catches for the respective trapping mechanisms pivoted to and extending through the top of the body at opposite sides of the obstruction, and longitudinally curved passage obstructing plates on the lower ends of the trip catches within the body, said trip catch plates being arranged to lie adjacent the first named obstruction when the trap is set and being movable laterally away from the bait holder for release of the trapping mechanisms, to prevent passage of the animal without being trapped.

In testimony whereof I affix my signature.

JOHN KRČ.